Jan. 10, 1939.   R. MOONEY   2,143,606
TRIPOD
Filed Dec. 13, 1935   2 Sheets-Sheet 2

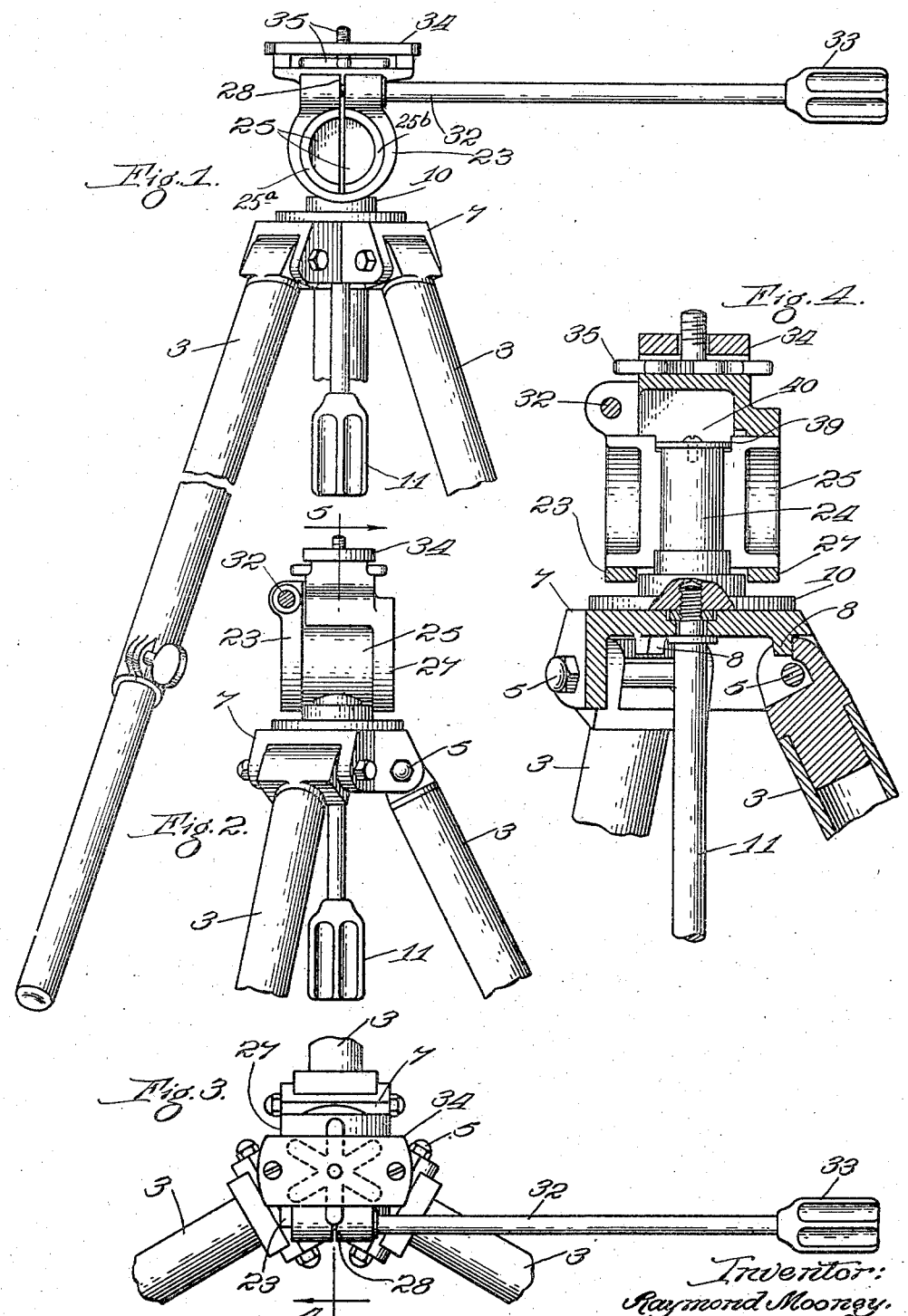

Inventor:
Raymond Mooney.
By Dynenforth, Lee, Chritton & Wiles
Attys.

Patented Jan. 10, 1939

2,143,606

UNITED STATES PATENT OFFICE 2,143,606

TRIPOD

Raymond Mooney, Kenilworth, Ill.

Application December 13, 1935, Serial No. 54,307

3 Claims. (Cl. 248—183)

This invention relates to improvements in universal mountings and is here shown as embodied in a tripod and, more especially, a tripod with a platform mounted on the top thereof, said mounting permitting universal adjustment. The universal mounting is accomplished by providing vertical and horizontal pivots.

Among the features of the invention is the provision of means for simultaneously or substantially simultaneously locking both pivots. In practice, I prefer to so proportion the parts that upon tightening the locking means, one pivot will engage slightly before the other.

Another feature of the invention is the provision of means for hinging the legs to the tripod so that their outward swinging will be stopped at a certain point.

My improved tripod is simple in construction, easy to operate and provides a sturdy, solid and firm support for any instrument such as a camera, theodolite, or the like.

Other features and advantages of my invention will appear more fully as I proceed with my specification.

In that form of device embodying the features of my invention shown in the accompanying drawings—

Figure 5:
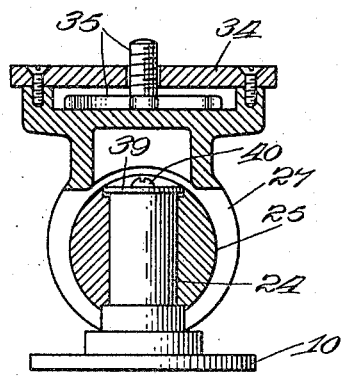
Figure 6:
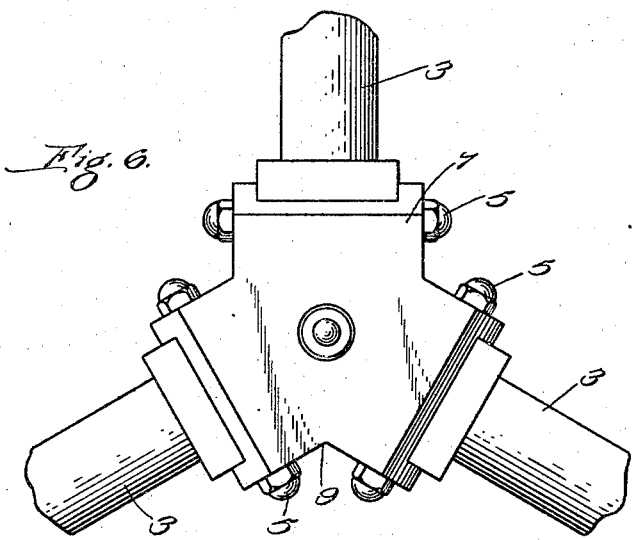
Figure 7:
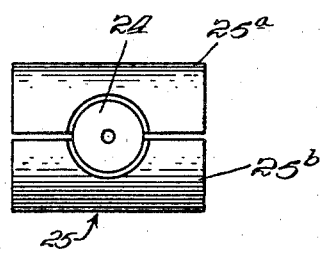

Figure 1 is a view in front elevation; Fig. 2 is a view in side elevation; Fig. 3 is a top plan view; Fig. 4 is a longitudinal vertical sectional view taken as indicated by the line 4 of Fig. 3; Fig. 5 is a transverse vertical sectional view taken as indicated by the line 5 of Fig. 2; Fig. 6 is a plan view of the tripod with the platform removed; and Fig. 7 is a fragmentary sectional view.

As shown in the drawings, 7 indicates a suitable support, such as the top of a tripod supported by three hinged legs 3, 3. 34 indicates a platform adapted to support the camera or other instrument used on the tripod. It will be helpful to give a general description of the universal mounting of this platform on the top of the tripod before describing the same in detail. The mounting includes primarily a vertical pivot, a horizontal split pivot pivotally mounted on the vertical pivot and two collars carried by the horizontal pivot. The platform is carried by the two collars. One of the collars is split and means are provided for constricting this collar. This serves to lock the collar against rotation on the horizontal pivot and simultaneously serves to clamp the two parts of the horizontal split pivot on the vertical pivot. It will be seen, therefore, that by tightening this single locking means, both pivots are locked and the platform can, therefore, be very easily and quickly locked in any adjusted position. As stated above, I prefer to proportion the parts, however, so that upon tightening the collar, the collar will be locked on the horizontal pivot before the latter is locked on the vertical pivot. I find this construction especially useful when the apparatus is used with a camera as the vertical adjustment of the camera can be made as desired and then locked, still permitting rotation of the camera in a horizontal plane for panoramic views.

24 indicates the vertical pivot upon which is pivotally mounted the split horizontal pivot 25. It will be seen that this horizontal pivot is split entirely through, the parts being indicated by the reference numeral 25a and 25b. This horizontal pivot is provided substantially at the center with a vertical bore embracing the vertical pivot 24. The adjacent surfaces of the two halves of this pivot are slightly relieved so that they may be brought together to clamp the pivot on the vertical pivot and lock it against rotation.

The platform 34 carries two depending collars 23 and 27 embracing the ends of the horizontal pivot 25, one of said collars lying on each side of the vertical pivot 24. The collar 23 is split, as indicated at 28 and is supported at a point intermediate to the ends of the split collar. Thus, one end of the split collar 23 is shown in Fig. 2 to be free of the platform 34. 32 indicates an elongated screw adapted to constrict this collar and provided with an operating handle 33.

In operation, tightening the screw 32 operates to clamp the split collar 23 on the end of the horizontal pivot to lock the platform against oscillation in a vertical plane. With the construction shown, the constricting of the collar 23 causes a locking of both collars. This is accomplished by making the horizontal pivot in two parts. Closing of the collar 23 on one end of the two parts 25, 25 draws the adjacent ends of these two parts together, causing them to fulcrum on the vertical pivot 24 with the result that the opposite ends are separated in the collar 27, thus locking the latter. It will be seen that this action also draws the two halves of the horizontal pivot 25 together to lock said horizontal pivot against rotation in a horizontal plane on the vertical pivot 24.

A washer 39 is fastened on top of the vertical pivot 24 by the screw 40 to prevent the horizontal pivot 25 from being removed vertically.

As here shown, the vertical pivot 24 is mounted on a base 10 detachably secured to the top 7 of the tripod by the depending screw 11.

Each of the legs 3 is hinged to the triangular top 7 by providing the latter with two depending lugs for each leg in the nature of a clevis, said lugs carrying a pin 5 on which the upper end of the leg is pivotally mounted. 8 indicates a depending lug on the top 7 of the tripod adjacent the pin 5. The lug 8 serves as a stop by engagement with the upper portion of the leg to limit outward swinging of the latter.

35 indicates the usual screw carried by the platform for engagement with the camera or other instrument to be supported on the platform.

The screw 32 is preferably made somewhat long so that it will serve as a lever or handle for manipulating or adjusting the platform 34 to any desired position. With this construction, the operator may grasp the handle 33 at the end of the screw with one hand, move the platform to the proper position, and then readily and quickly lock the same in its adjusted position by twisting the screw with the same hand, without loosening his grasp.

The screw 32 is so positioned with respect to the platform 34 and the top 7 of the tripod that complete 180 degree movement in the vertical plane is provided. In order to facilitate this, and also to facilitate complete collapse of the tripod when not in use, the top 7 is recessed as shown at 9.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A swivel mounting including: a base; a vertical pivot on the base; a split horizontal pivot member pivotally mounted on said vertical pivot; two collars pivotally mounted on said horizontal pivot member on opposite sides of said vertical pivot, one of said collars being split on one side; said collars being adapted to support an upper member thereon; and manually controlled screw means for constricting said split collar to lock the same on the horizontal pivot member, whereby the said pivot member successively expands against the other collar, locking itself thereon, and constricts upon the vertical pivot locking itself thereon.

2. A swivel mounting, said mounting including: a base; a vertical pivot on the base; a split horizontal pivot member pivotally mounted on said vertical pivot; two collars pivotally mounted on said horizontal pivot member on opposite sides of said vertical pivot, one of said collars being split on one side; a platform mounted on said collars being attached to the split collar at a point intermediate to the ends of the split ring; and manually controlled means for constricting said split collar to lock the same on the horizontal pivot member, whereby the horizontal pivot member expands against and locks itself upon the other collar.

3. A camera support including: a base; a vertical pivot; a split horizontal pivot member pivotally mounted on said vertical pivot; said camera support having means pivotally mounting said support on said horizontal pivot on one side of said vertical pivot and adapted to hold said horizontal pivot in position; and clamping means carried by said horizontal pivot on the other side of said vertical pivot for drawing together at one end the two parts of the split horizontal pivot, whereby said pivot successively engages said first mentioned means, locking itself therein, and then constricts said split horizontal pivot on the vertical pivot, locking itself thereon.

RAYMOND MOONEY.